United States Patent
Park et al.

(10) Patent No.: US 11,050,518 B2
(45) Date of Patent: Jun. 29, 2021

(54) METHOD FOR TRANSMITTING AND RECEIVING SIGNAL BETWEEN TERMINAL AND BASE STATION IN WIRELESS COMMUNICATION SYSTEM, AND APPARATUS FOR SUPPORTING SAME

(71) Applicant: LG Electronics Inc., Seoul (KR)

(72) Inventors: Changhwan Park, Seoul (KR); Seonwook Kim, Seoul (KR); Hanjun Park, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 16/491,670

(22) PCT Filed: Mar. 8, 2018

(86) PCT No.: PCT/KR2018/002761
§ 371 (c)(1),
(2) Date: Sep. 6, 2019

(87) PCT Pub. No.: WO2018/164506
PCT Pub. Date: Sep. 13, 2018

(65) Prior Publication Data
US 2020/0036482 A1 Jan. 30, 2020

Related U.S. Application Data

(60) Provisional application No. 62/468,390, filed on Mar. 8, 2017.

(51) Int. Cl.
*H04L 1/18* (2006.01)
*H04L 1/16* (2006.01)
*H04L 5/00* (2006.01)

(52) U.S. Cl.
CPC .......... *H04L 1/1819* (2013.01); *H04L 1/1621* (2013.01); *H04L 1/1809* (2013.01);
(Continued)

(58) Field of Classification Search
CPC ... H04L 1/1819; H04L 1/1621; H04L 1/1809; H04L 1/1854; H04L 1/1861; H04L 5/0055
See application file for complete search history.

(56) References Cited

U.S. PATENT DOCUMENTS

2010/0017674 A1* 1/2010 Mo ............... H04L 1/1816
714/749
2016/0233999 A1* 8/2016 Chendamarai Kannan ................. H04L 1/1861

OTHER PUBLICATIONS

MediaTek Inc. ("On multiple HARQ bits per TB and feedback mechanism", 3GPP TSG RAN WG1 Meeting #88, R1-1702738, Feb. 13-17, 2017) (Year: 2017).*

(Continued)

*Primary Examiner* — Chi H Pham
*Assistant Examiner* — Ji-Hae Yea
(74) *Attorney, Agent, or Firm* — Dentons US LLP

(57) ABSTRACT

Disclosed are a method for transmitting and receiving a signal between a terminal and a base station in a wireless communication system and an apparatus for supporting the same. More particularly, disclosed is an explanation for a method of transmitting and receiving a signal between a terminal and a base station according to a new HARQ procedure which differs from a Hybrid Automatic Repeat reQuest (HARQ) procedure supported in a conventional wireless communication system.

13 Claims, 11 Drawing Sheets

(52) U.S. Cl.
CPC .......... *H04L 1/1854* (2013.01); *H04L 1/1861* (2013.01); *H04L 5/0055* (2013.01)

(56) References Cited

OTHER PUBLICATIONS

CATT ("Discussion on HARQ enhancements for NR", 3GPP TSG RAN WG1 Meeting #88, R1-1702101, Feb. 13-17, 2017) (Year: 2017).*
Qualcomm Incorporated ("Multi-bit HARQ-ACK feedback", 3GPP TSG-RAN WG1 Meeting #88, R1-1702636, Feb. 13-17, 2017) (Year: 2017).*
Nokia, Alcatel-Lucent Shanghai Bell, "Multi-bit Feedback for NR HARQ operation", 3GPP TSG-RAN WG1 Meeting #88, Feb. 13-17, 2017, R1-1703325.
Nokia, Alcatel-Lucent Shanghai Bell, "Enriched feedback for adaptive HARQ", 3GPP TSG-RAN WG1 #NR, Jan. 16-20, 2017, R1-1701020.
ZTE, ZTE Microelectronics, "NR HARQ timing and feedback schemes", 3GPP TSG RAN WG1 Meeting #88, Feb. 13-17, 2017, R1-1701593.
InterDigital Communications, "Multi-bits HARQ feedback", 3GPP TSG RAN WG1 Meeting #88, Feb. 13-17, 2017, R1-1702379.
Fujitsu, "Support of multi bit HARQ-ACK feedback per TB", 3GPP TSG RAN WG1 Meeting #88, Feb. 13-17, 2017, R1-1701919.

* cited by examiner

METHOD FOR TRANSMITTING AND RECEIVING SIGNAL BETWEEN TERMINAL AND BASE STATION IN WIRELESS COMMUNICATION SYSTEM, AND APPARATUS FOR SUPPORTING SAME

This application is a National Stage Entry of International Application No. PCT/KR2018/002761 filed Mar. 8, 2018, which claims the benefit of U.S. Provisional Application No. 62/468,390 filed Mar. 8, 2017, all of which are hereby incorporated by reference in their entirety for all purposes as if fully set forth herein.

TECHNICAL FIELD

The present disclosure relates to a wireless communication system, and more particularly, to a method of transmitting and receiving a signal between a terminal and a base station in a wireless communication system and apparatus for supporting the same.

More specifically, the present disclosure is directed to a method of transmitting and receiving a signal between a terminal and a base station based on a new hybrid automatic repeat request (HARQ) procedure different from that supported in the conventional wireless communication system.

BACKGROUND ART

Wireless access systems have been widely deployed to provide various types of communication services such as voice or data. In general, the wireless access system means a multiple access system that supports communication between multiple users by sharing available system resources (bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity for mobile broadband communication much improved than the existing radio access technology (RAT) has increased. In addition, massive machine type communications (MTC) capable of providing various services anytime and anywhere by connecting a number of devices or things to each other has been considered in the next generation communication system. Moreover, a communication system design capable of supporting services/UEs sensitive to reliability and latency has also been discussed.

The introduction of next generation RAT considering the enhanced mobile broadband communication, massive MTC, ultra-reliable and low latency communication (URLLC), etc. has been discussed.

DISCLOSURE

Technical Problem

The object of the present disclosure is to provide a method by which a terminal and a base station transmit and receive acknowledgement (ACK) information for a received signal in a wireless communication system.

Specifically, the object of the present disclosure is to provide a method capable of transmitting and receiving ACK information on a code block group (CBG) basis rather than on a transmission (or transport) block (TB) basis as in the conventional wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting and receiving a signal between a terminal (user equipment) and a base station in a wireless communication system and apparatuses therefor.

In an aspect of the present disclosure, provided herein is a method of transmitting and receiving a signal to and from a base station (BS) by a user equipment (UE) in a wireless communication system. The method may include receiving, from the BS, a signal composed of at least one code block group (CBG) and transmitting, to the BS, acknowledgement (ACK) information for each CBG, wherein the ACK information includes a plurality of numbers of bit information.

In another aspect of the present disclosure, provided herein is a method of transmitting and receiving a signal to and from a UE by a BS in a wireless communication system. The method may include transmitting, to the UE, a signal composed of at least one CBG and receiving, from the UE, ACK information for each CBG, wherein the ACK information includes a plurality of numbers of bit information.

In still another aspect of the present disclosure, provided herein is a UE for transmitting and receiving a signal to and from a BS in a wireless communication system. The UE may include a transmitter, a receiver, and a processor connected to the transmitter and the receiver. The processor may be configured to receive, from the BS, a signal composed of at least one CBG and transmit, to the BS, ACK information for each CBG, wherein the ACK information includes a plurality of numbers of bit information.

In a further aspect of the present disclosure, provided herein is a BS for transmitting and receiving a signal to and from a UE in a wireless communication system. The BS may include a transmitter, a receiver, and a processor connected to the transmitter and the receiver. The processor may be configured to transmit, to the UE, a signal composed of at least one CBG and receive, from the UE, ACK information for each CBG, wherein the ACK information includes a plurality of numbers of bit information.

Each CBG may comprise at least one code block (CB). The plurality of numbers of the bit information may indicate any one of the following states: one state for indicating ACK and N states for indicating non-acknowledgement (NACK).

In this case, each of the N states may indicate any combination of at least one of: (A) first information indicating whether a number of CBs where NACK occurs in a corresponding CBG is greater than or equal to a predetermined value and whether, when the number of CBs where NACK occurs is greater than or equal to the predetermined value, there are consecutive CBs among the CBs where NACK occurs; (B) second information indicating a location region including the CBs where NACK occurs in the corresponding CBG; (C) third information indicating a range including the ratio of the CBs where NACK occurs to whole CBs included in the corresponding CBG; and (D) fourth information indicating a retransmission method preferred by the UE for the corresponding CBG.

The first information may indicate one of: (A-1) information indicating that the number of CBs where NACK occurs in the corresponding CBG is smaller than or equal to the predetermined value; (A-2) information indicating that the number of CBs where NACK occurs in the corresponding CBG is greater than the predetermined value and the CBs where NACK occurs are not consecutive; and (A-3) information indicating that the number of CBs where NACK occurs in the corresponding CBG is greater than the predetermined value and the consecutive CBs are present among the CBs where NACK occurs.

The second information may indicate one of: (B-1) information indicating that among first and second CBGs obtained by dividing the corresponding CBG in half, the first CBG includes at least one CB where NACK occurs; (B-2) information indicating that among the first and second CBGs obtained by dividing the corresponding CBG in half, the second CBG includes at least one CB where NACK occurs; and (B-3) information indicating that both the first and second CBGs obtained by dividing the corresponding CBG in half include at least one CB where NACK occurs.

The third information may indicate one of: (C-1) information indicating that the ratio of the CBs where NACK occurs to the whole CBs included in the corresponding CBG is smaller than or equal to a first threshold; (C-2) information indicating that the ratio of the CBs where NACK occurs to the whole CBs included in the corresponding CBG is greater than the first threshold and smaller than or equal to a second threshold; and (C-3) information indicating that the ratio of the CBs where NACK occurs to the whole CBs included in the corresponding CBG is greater than the second threshold.

The fourth information may indicate one of: (D-1) information indicating that the retransmission method preferred by the UE for the corresponding CBG is an incremental redundancy (IR) type; and (D-2) information indicating that the retransmission method preferred by the UE for the corresponding CBG is a chase combining (CC) type.

When some CBs in the received signal composed of the at least one CBG are dropped by the BS, the UE may further receive information on the dropped CBs from the BS.

In this case, the UE may determine the N states by excluding the dropped CBs from counting or assuming the dropped CBs as ACK.

The UE may further receive, from the BS, a response message in response to the ACK information for each CBG.

The response message may comprise retransmission of whole CBs included in a CBG reported by the UE as NACK or retransmission of several CBs included in the CBG reported by the UE as NACK.

When some CBs in the received signal composed of the at least one CBG are dropped by the BS, the response message may comprise retransmission of the several CBs included in a CBG reported by the UE as NACK.

When some CBs in the received signal composed of the at least one CBG are dropped by the BS, if the UE transmits, to the BS, ACK for CBGs except the some CBGs after receiving information on the some CBs from the BS, the response message may include the several CBs.

The UE may further transmit, to the BS, ACK information for at least one CBG included in the response message.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, a UE and a BS can transmit and receive ACK information for each CBG in a TB with a larger size than the conventional TB. In addition, the UE and BS can retransmit a specific CB or a specific CBG based on the ACK information.

In particular, since a plurality of pieces of bit information is used to transmit NACK for the specific CBG, the UE and BS can obtain more details from the NACK and thus perform retransmission based on the details more properly.

The above-described aspects of the present disclosure are merely a part of preferred embodiments of the present disclosure. Those skilled in the art will derive and understand various embodiments reflecting the technical features of the present disclosure from the following detailed description of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
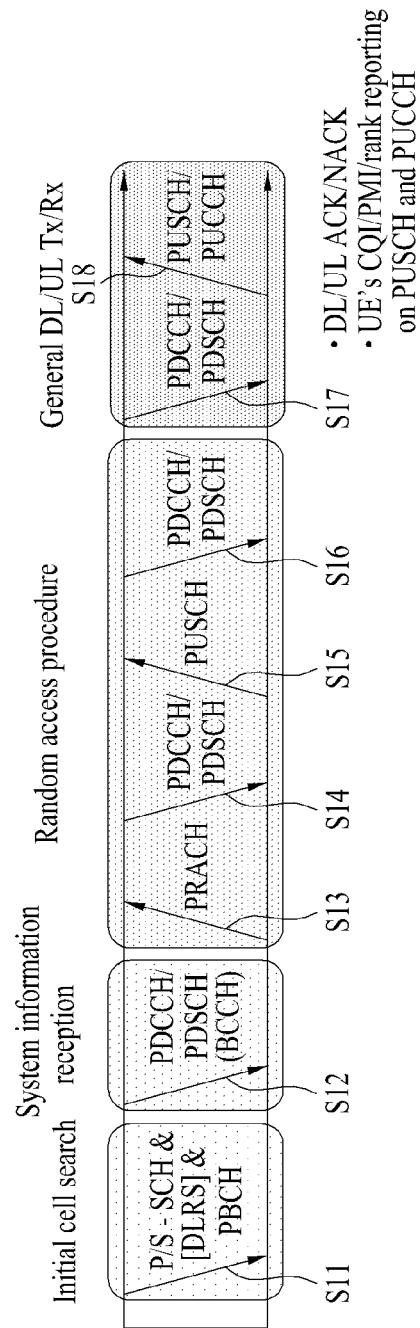
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36. 331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure, clear channel assessment (CCA), channel access procedure (CAP), for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an base station. Specifically, the UE synchronizes its timing to the base station and acquires information such as a cell Identifier (ID) by receiving a Primary Synchronization Channel (P-SCH) and a Secondary Synchronization Channel (S-SCH) from the base station.

Then the UE may acquire information broadcast in the cell by receiving a Physical Broadcast Channel (PBCH) from the base station.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the base station, the UE may perform a random access procedure with the base station (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the base station (S17) and transmit a Physical Uplink Shared Channel (PUSCH) and/or a Physical Uplink Control Channel (PUCCH) to the base station (S18), in a general UL/DL signal transmission procedure.

Control information that the UE transmits to the base station is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
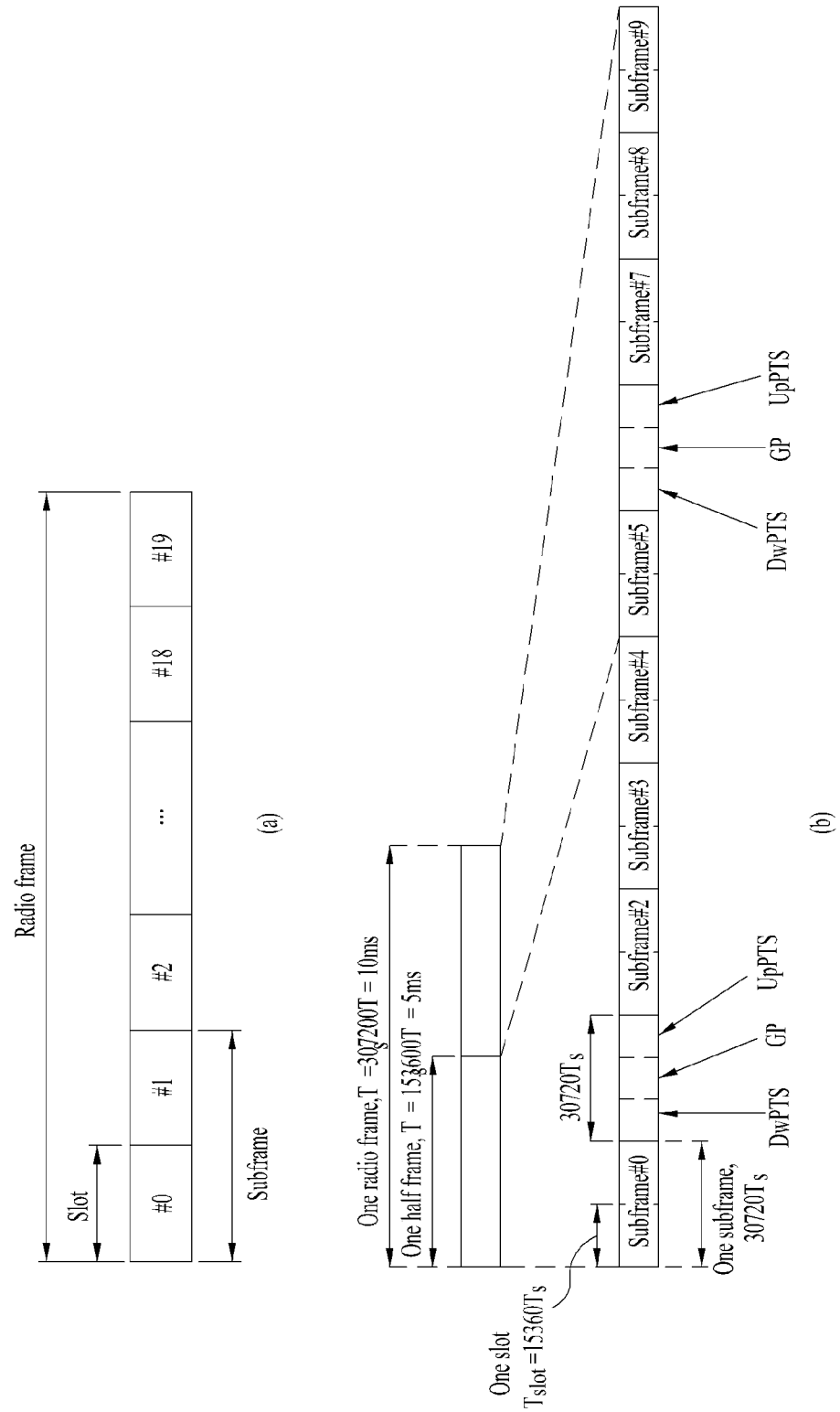
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($Tf=307200 \cdot Ts$) long, including equal-sized 20 slots indexed from 0 to 19. Each slot is 0.5 ms ($Tslot=15360 \cdot Ts$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $Ts=1/(15 \text{ kHz} \times 2048)=3.2552 \times 10-8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($Tf=307200 \cdot Ts$) long, including two half-frames each having a length of 5 ms ($=153600 \cdot Ts$) long. Each half-frame includes five subframes each being 1 ms ($=30720 \cdot Ts$) long. An ith subframe includes 2ith and (2i+1)th slots each having a length of 0.5 ms ($Tslot=15360 \cdot Ts$). Ts is a sampling time given as $Ts=1/(15 \text{ kHz} \times 2048)=3.2552 \times 10-8$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an base station. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | | Extended cyclic prefix in downlink | | |
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the LTE Rel-13 system, it is newly added that the configuration of a special subframe (e.g., the lengths of DwPTS/GP/UpPTS) is established by considering the number of additional SC-FDMA symbols, X, which is provided by the higher layer parameter named "srs-UpPtsAdd" (if the parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
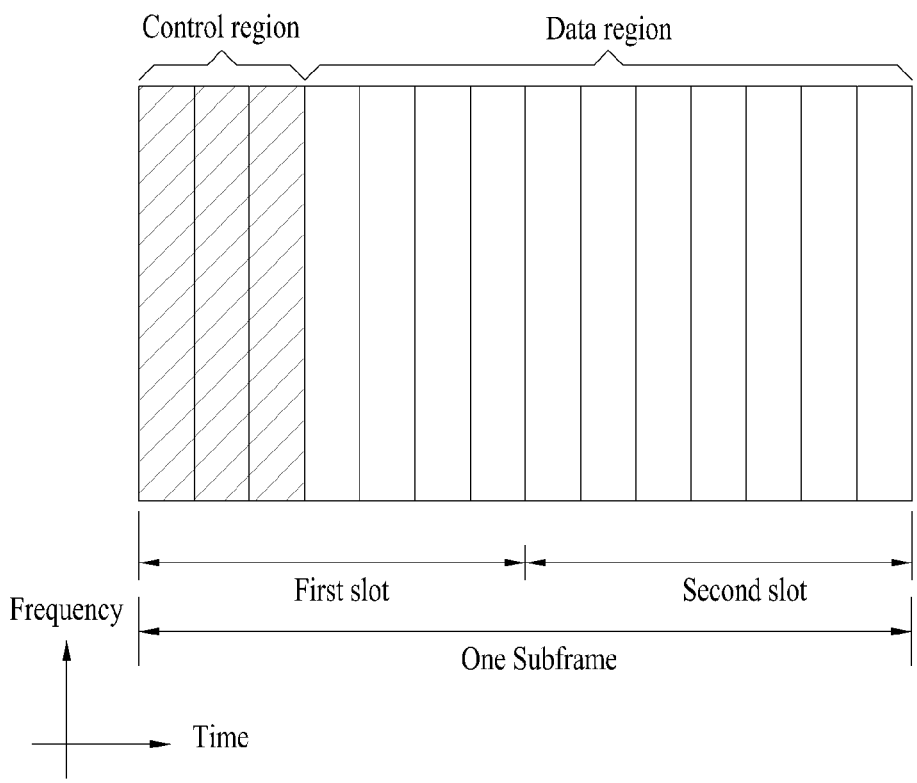
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physi-

TABLE 2

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
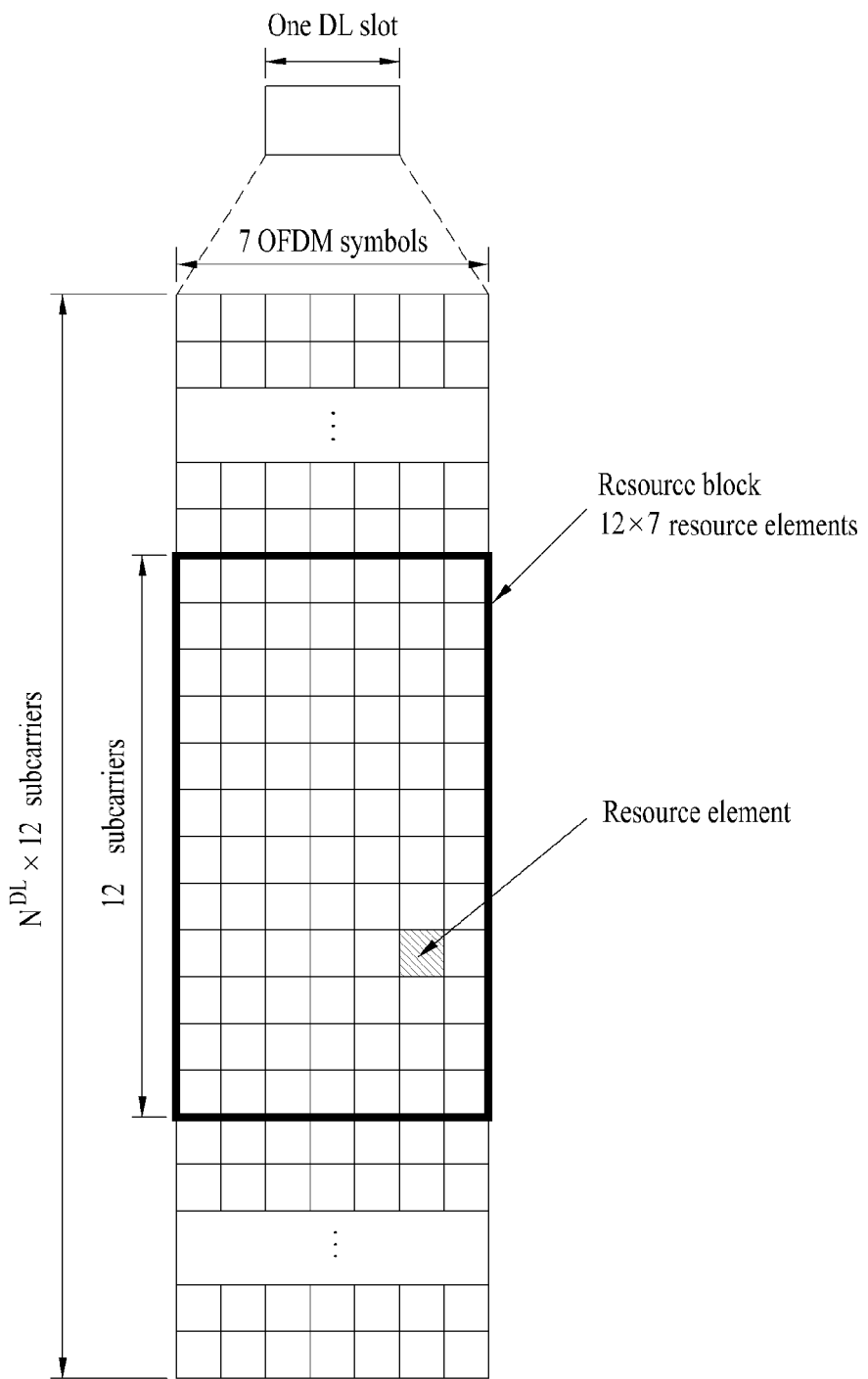
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
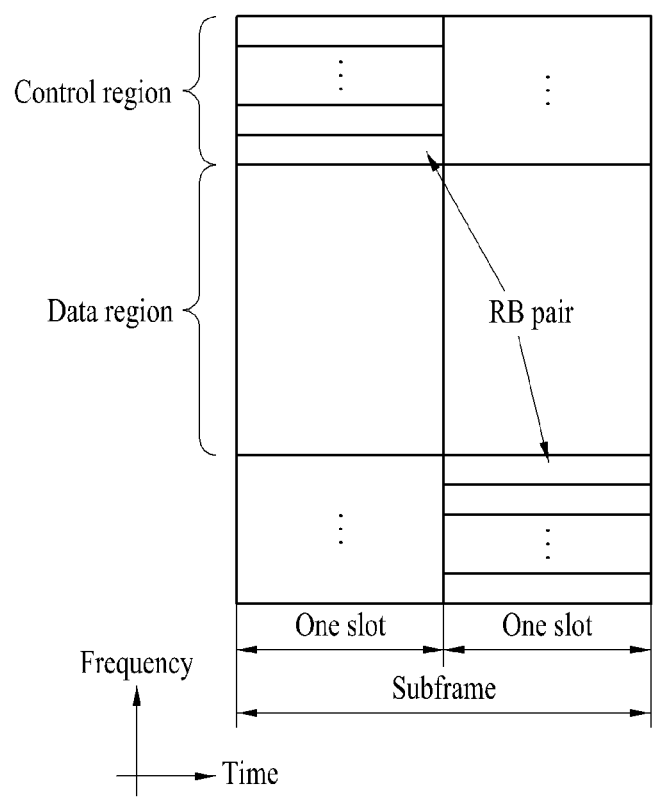
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region cal Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices have required higher communication capacity, the necessity for the mobile broadband communication much improved than the existing RAT has increased. In addition, massive machine type communications (MTC) capable of providing various services anytime and anywhere by connecting a number of devices or things has also been considered. Moreover, a communication system design capable of supporting services/UEs sensitive to reliability and latency has been proposed.

The introduction of new RAT considering the enhanced mobile broadband communication, massive MTC, ultra-reliable and low-latency communication (URLLC), etc. has been discussed. In the present disclosure, the corresponding technology is referred to as new RAT or new radio (NR) for simplicity.

2.1. Numerologies

The NR system to which the present disclosure is applicable supports various OFDM numerologies as shown in Table 3 below. The value of μ and cyclic prefix information per carrier bandwidth part can be signaled for DL and UL, respectively. For example, the value of u and cyclic prefix information for DL carrier bandwidth part may be signaled though higher layer signaling such as DL-BWP-mu and DL-MWP-cp. As another example, the value of μ and cyclic prefix information for UL carrier bandwidth part may be signaled though higher layer signaling such as UL-BWP-mu and UL-MWP-cp.

TABLE 3

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2. Frame Structure

DL and UL transmission are configured with frames each having a length of 10 ms. Each frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each frame may include two half-frames with the same size. In this case, the two half-frames may include subframes 0 to 4 and subframes 5 to 9, respectively.

Regarding the subcarrier spacing μ, slots may be numbered within one subframe in ascending order as follows: $n_s^\mu \in \{0, \ldots, N_{slot}^{subframe,\mu}-1\}$ and may also be numbered within a frame in ascending order as follow: $N_{s,f}^\mu \in \{0, \ldots, N_{slot}^{frame,\mu}-1\}$. In this case, the number of consecutive OFDM symbols in one slot ($N_{symb}^{slot}$) may be determined as shown in Tables 4 and 5 below according to the cyclic prefix. The start slot ($n_s^\mu$) of a subframe is aligned with the start OFDM symbol ($n_s^\mu N_{symb}^{slot}$) of the corresponding subframe in the time domain. Table 4 shows the number of OFDM symbols in each slot/frame/subframe in the case of a normal cyclic prefix, and Table 5 shows the number of OFDM symbols in each slot/frame/subframe in the case of an extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 4-continued

| μ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $NN_{slot}^{subframe,\mu}$ |
|---|---|---|---|
| 2 | 12 | 40 | 4 |

The NR system to which the present disclosure is applicable may employ a self-contained slot structure as the above-described slot structure.

Figure 6:
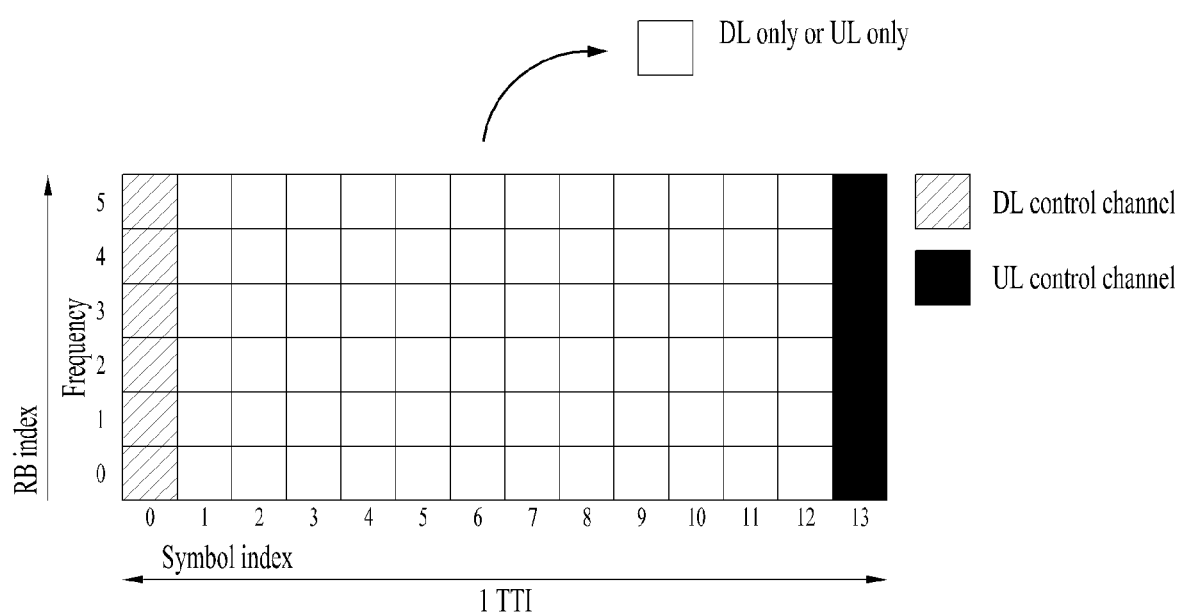
FIG. 6 is a diagram illustrating a self-contained subframe structure applicable to the present disclosure.

FIG. 6 is a diagram illustrating a self-contained subframe structure applicable to the present disclosure.

In FIG. 6, the hatched region (e.g., symbol index=0) represents a DL control region, and the black region (e.g., symbol index=13) represents an UL control region. The other region (e.g., symbol index=1 to 12) may be used for DL data transmission or for UL data transmission.

Based on the self-contained slot structure, a BS and a UE may sequentially perform DL transmission and UL transmission in one slot. That is, the BS and UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 6.

For example, a slot may have various slot formats. In this case, OFDM symbols in each slot can be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

2.3. Analog Beamforming

In a millimeter wave (mmW) system, since a wavelength is shortened, a plurality of antenna elements may be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent BF per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective BF is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
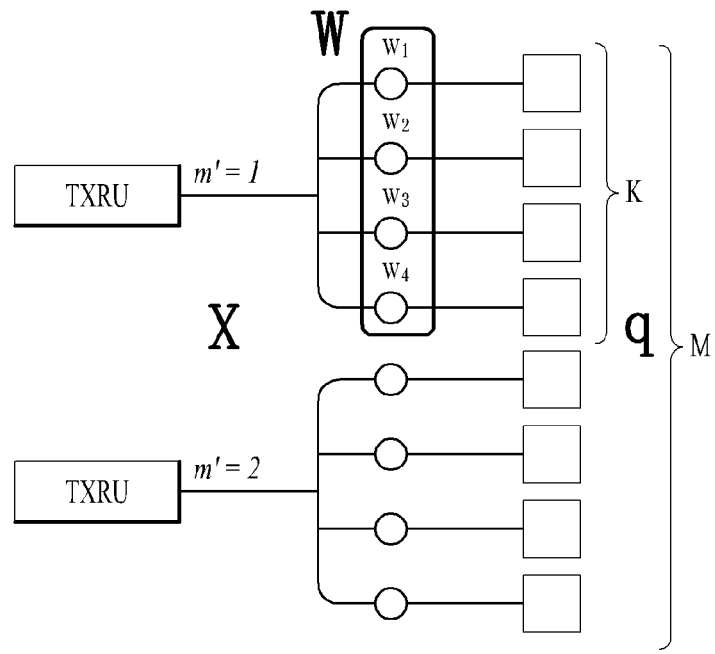
FIGS. 7 and 8 are diagrams illustrating representative methods for connecting TXRUs to antenna elements.
Figure 8:
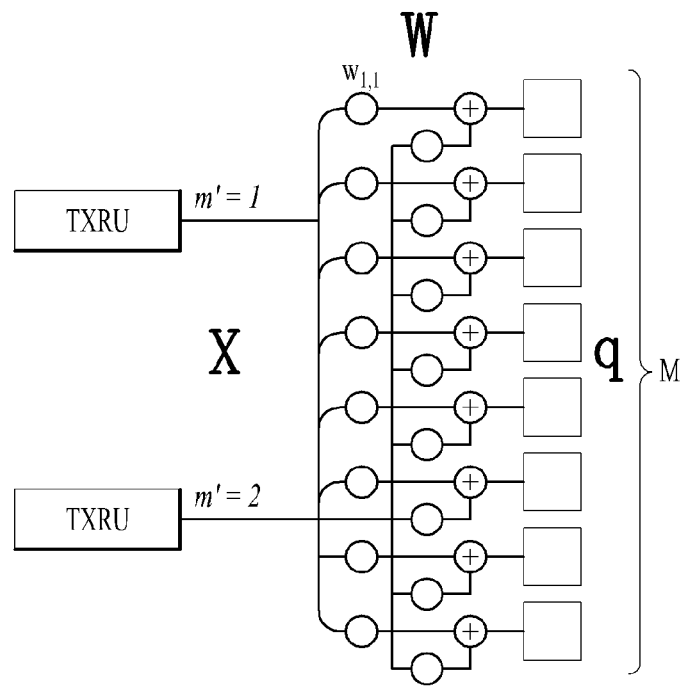

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog BF. In this case, the mapping relationship between CSI-RS antenna ports and TXRUs may be 1:1 or 1-to-many.

The configuration shown in FIG. 7 has a disadvantage in that it is difficult to achieve BF focusing but has an advantage in that all antennas can be configured at low cost.

On the contrary, the configuration shown in FIG. 8 is advantageous in that BF focusing can be easily achieved. However, since all antenna elements are connected to the TXRU, it has a disadvantage of high cost.

When a plurality of antennas is used in the NR system to which the present disclosure is applicable, the hybrid BF obtained by combining the digital BF and analog BF may be applied. In this case, the analog BF (or radio frequency (RF) BF) means an operation of performing precoding (or combining) at the RF stage. In the hybrid BF, precoding (or combining) is performed at each of the baseband stage and RF stage, respectively. Thus, the hybrid beamforming is advantageous in that it can guarantee performance similar to the digital BF while reducing the number of RF chains and the number of D/A (digital-to-analog) (or A/D (analog-to-digital) converters.

For convenience of description, a hybrid BF structure may be represented by N transceiver units (TXRUs) and M physical antennas. In this case, digital BF for L data layers to be transmitted by a transmission end may be represented by an N-by-L matrix. Thereafter, N converted digital signals are converted into analog signals by the TXRUs, and then analog BF, which is represented by an M-by-N matrix, is applied the converted signals.

Figure 9:
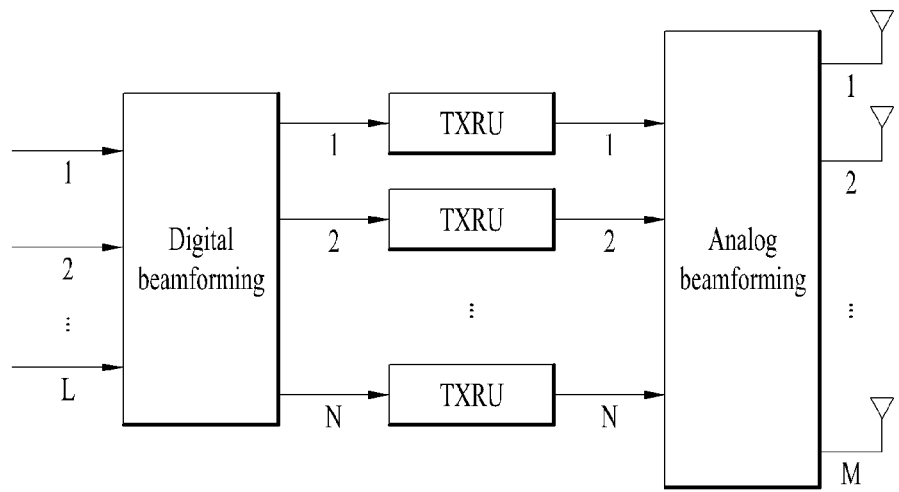
FIG. 9 is a diagram schematically illustrating a hybrid beamforming structure from the perspective of transceiver units (TXRUs) and physical antennas according to an embodiment of the present disclosure.

FIG. 9 is a diagram schematically illustrating a hybrid beamforming structure from the perspective of TXRUs and physical antennas according to an embodiment of the present disclosure. In FIG. 9, the number of digital beams is L and the number of analog beams is N.

Additionally, to provide more efficient BF to UEs located in a specific area, a method of designing a BS capable of changing analog BF on a symbol basis has been considered in the NR system to which the present disclosure is applicable. Further, the NR system to which the present disclosure is applicable has considered the introduction of a plurality of antenna panels to which independent hybrid BF is applicable by defining N specific TXRUs and M RF antennas as one antenna panel as illustrated in FIG. 9.

When a BS uses a plurality of analog beams as described above, each UE has a different analog beam suitable for signal reception. Thus, the NR system to which the present disclosure is applicable has considers the beam sweeping operation where a BS transmits signals (at least synchronization signals, system information, paging, etc.) by applying a different analog beam to each symbol within a specific subframe (SF) so that all UEs may have reception opportunities.

Figure 10:
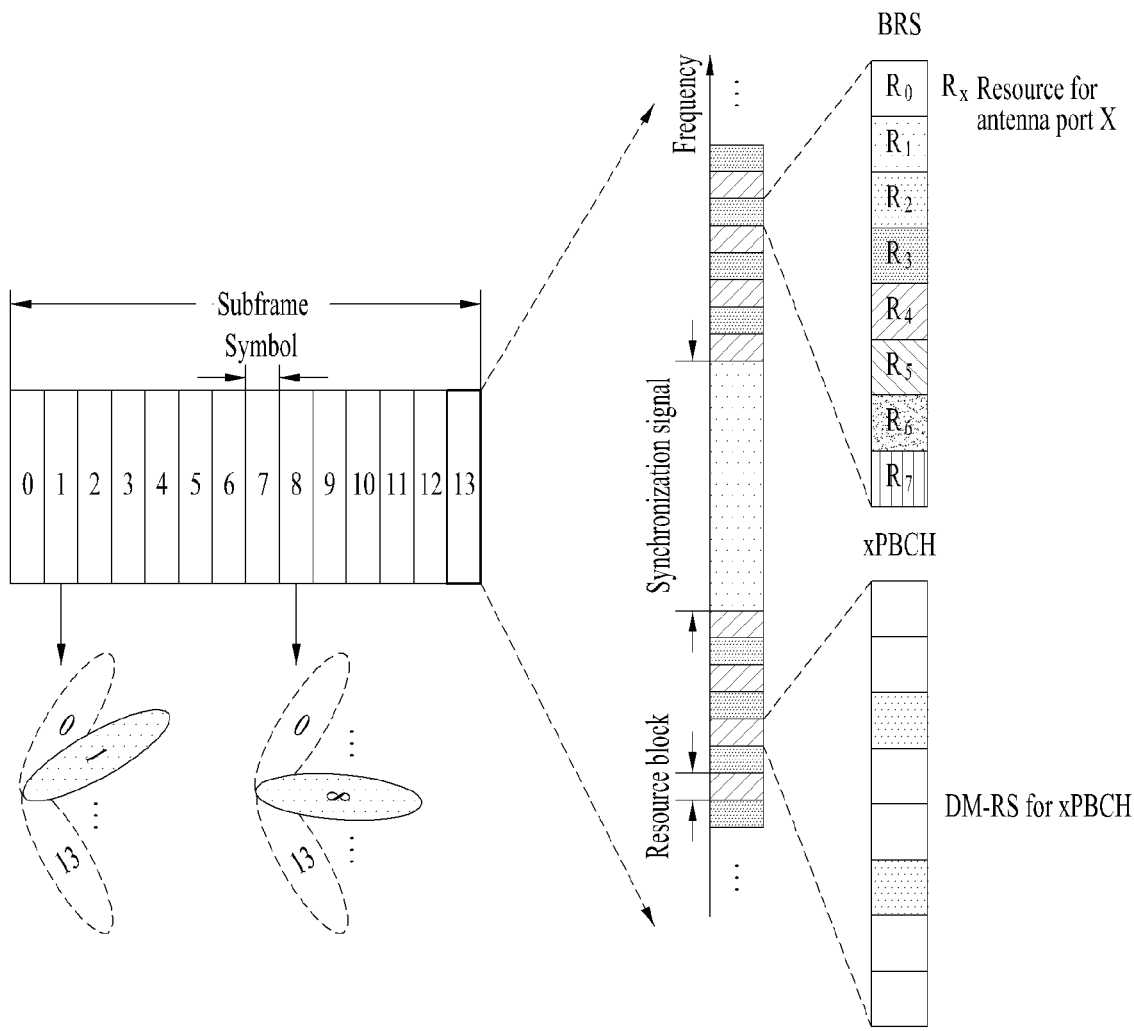
FIG. 10 is a diagram schematically illustrating beam sweeping operation for synchronization signals and system information in a downlink (DL) transmission process according to an embodiment of the present disclosure.

FIG. 10 is a diagram schematically illustrating beam sweeping operation for synchronization signals and system information in DL transmission process according to an embodiment of the present disclosure.

In FIG. 10, a physical resource (or channel) for transmitting system information of the NR system to which the present disclosure is applicable in a broadcasting manner is referred to as an xPBCH. In this case, analog beams belonging to different antenna panels may be simultaneously transmitted in one symbol.

In addition, to measure a channel for each analog beam, the introduction of a beam reference signal (BRS), which is a reference signal (RS) to which a single analog beam (corresponding to a specific antenna panel) is applied, has been discussed in the NR system to which the present disclosure is applicable. The BRS may be defined for a plurality of antenna ports, and each BRS antenna port may correspond to a single analog beam. In this case, in contrast to the BRS, all analog beams in an analog beam group may be applied to a synchronization signal or xPBCH to assist a random UE to correctly receive the synchronization signal or xPBCH.

3. Proposed Embodiments

Hereinafter, the configurations according to the present disclosure will be described in detail based on the above-described technical features.

In the NR system to which the present disclosure is applicable, it is expected that due to the use of eMBB, the maximum size of a transport block (TB) may increase several times or more compared to that of the legacy LTE system. In addition, compared to the prior art, the number of code blocks (CBs) included in each TB may increase by several times or more. As a result, the conventional hybrid automatic repeat request (HARQ) operation, which is performed for each TB and requires retransmission of all CBs included in the TB, may become inefficient.

In addition, if data for URLLC, which requires very short latency, is overridden to have a higher priority while eMBB transmission is performed, the HARQ for each TB may not be suitable.

Moreover, considering a time-selective interference scenario where an interference signal from a neighboring cell may be power boosted by a pencil beam (e.g., an antenna pattern with a narrow main lobe, where the contour line of a radiation pattern approximates to a circle) in a dynamic time division duplex (TDD) environment, the HARQ for each TB may become more inefficient.

Therefore, a method of performing HARQ for each codeword block group (CBG) or CB included in a TB is considered in the NR system, instead of performing the HARQ for each TB.

For example, one TB, which is composed of N CBs, may include G CBGs. In this case, each CBG may be composed of B or B' CBs. B' indicates the number of CBs included in the last CBG, and the value of B' may be equal to or different from B depending on the values of N and G.

Figure 11:
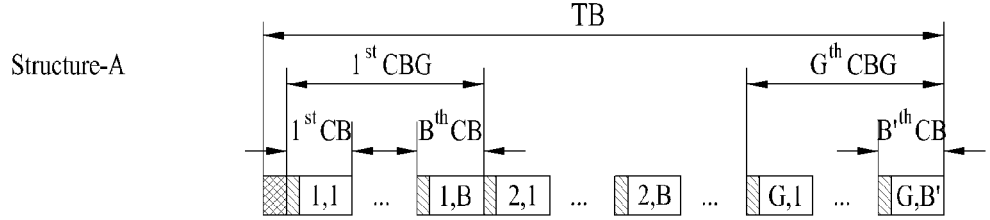
FIG. 11 is a diagram schematically illustrating a cyclic redundancy check (CRC) configuration for each CB in one TB applicable to the present disclosure.

FIG. 11 is a diagram schematically illustrating a cyclic redundancy check (CRC) configuration for each CB in one TB applicable to the present disclosure.

As shown in FIG. 11, a CRC (CB-CRC) may be inserted in each CB in both structures A and B. However, structure B is different from structure A in that a CRC (CBG-CRC) is additionally inserted in each CBG.

In structures A and B, one TB is composed of G CBGs, and a CRC (TB-CRC) for the one RB may be inserted.

Each of the CB-CRC, CBG-CRC and TB-CRC may be configured to have a different size (e.g., length). In structure B, the CBG-CRC of a G-th CBG may be omitted, or it may have a different size from those of other CBGs.

Figure 12:
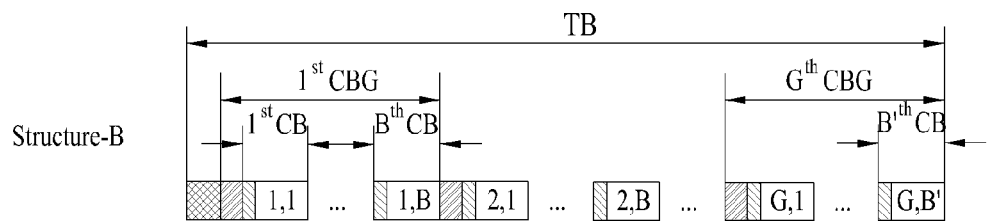
FIG. 12 is a diagram illustrating a method of displaying CRC decoding results and CRC-bad causes.

FIG. 12 is a diagram illustrating a method of displaying CRC decoding results and CRC-bad causes. Herein, 'CRC-bad' may mean that the result of a CRC at a receiving end is different from that intended by a transmitting end when the transmitting end inserts a CRC parity bit. In general, the transmitting and receiving ends comply with rules determined thereby. Specifically, the receiving end (e.g., a UE) may perform the CRC in order to determine whether a rule intended by the transmitting end is maintained after decoding of a data block. In the following, 'CRC-good' means that the decoding result indicates that the intention (or rule) of inserting the CRC parity bit is not changed between the transmitting and receiving ends, whereas 'CRC-bad' means that the decoding result indicates that the intention (or rule) of inserting the CRC parity bit is changed between the transmitting and receiving ends.

In FIG. 12, the first block indicates a CB where 'CRC-good' occurs, and each of the second to fourth blocks indicates a CB where 'CRC-bad' occurs.

Specifically, the second block indicates a CB where a CB decoding error occurs due to an insufficient signal-to-noise ratio (SNR). In general, even when link adaptation is applied, a decoding error may occur in some CBs (about 1 to 10%) in a fading environment (e.g., attenuation difference, phase difference, etc.).

The third block indicates a CB where the CB decoding error occurs before or after the corresponding CB due to degradation of inter-slot channel estimation performance when some CBs are punctured due to time-selective interference or URLLC transmission. The CRC-bad occurrence probability may be higher than the about 1 to 10% CB error probability in the normal fading environment (however, it may be lower than a CB error probability due to time-selective interference, which will be described later).

The fourth block indicates a CB where the CB decoding error occurs when some CBs are punctured due to the time-selective interference or URLLC transmission. In the case of CB puncturing, the CB error probability increases to 100%, and in the case of the time-selective interference, the CB error probability may be much higher than the CB error probability caused by the above-described inter-slot channel estimation performance degradation.

Figure 13:
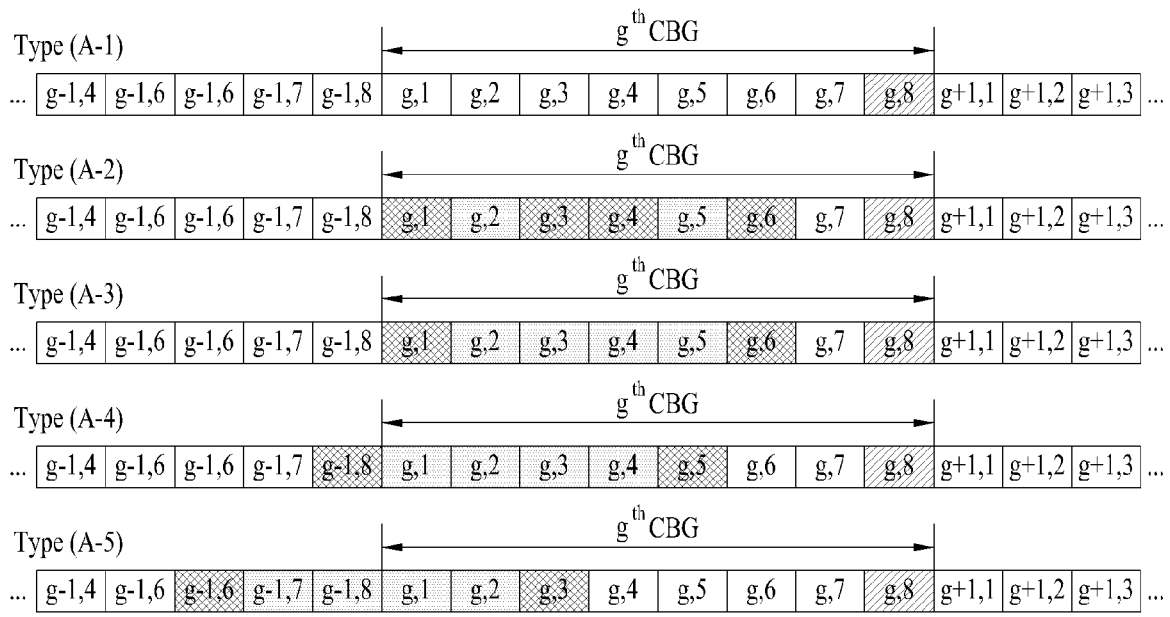
FIGS. 13 to 15 are diagrams illustrating CRC decoding result scenarios according to the present disclosure.
Figure 14:
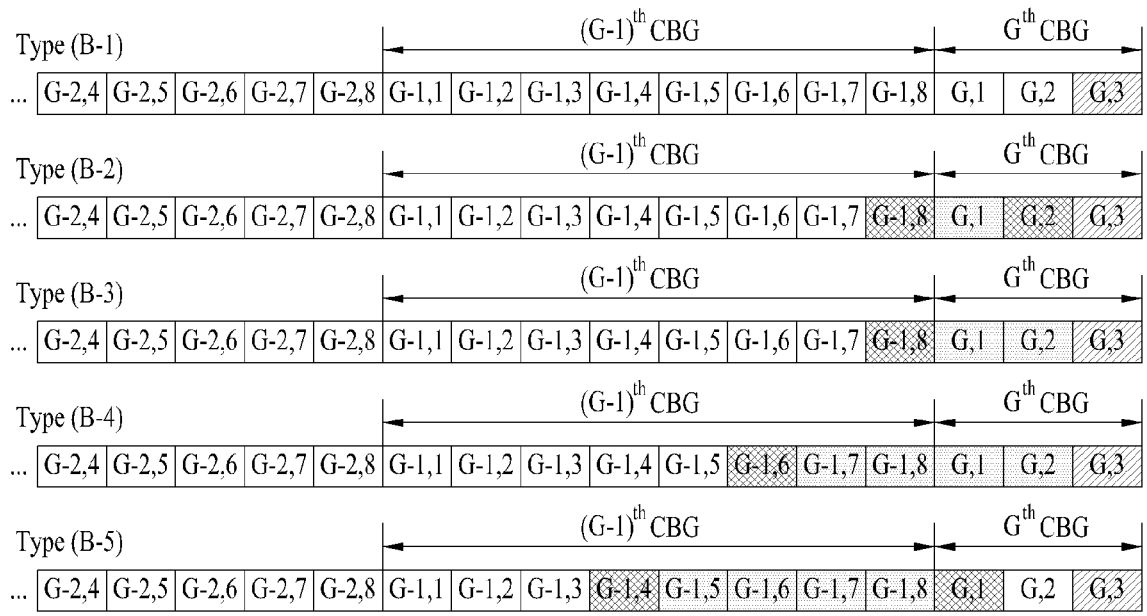
Figure 15:
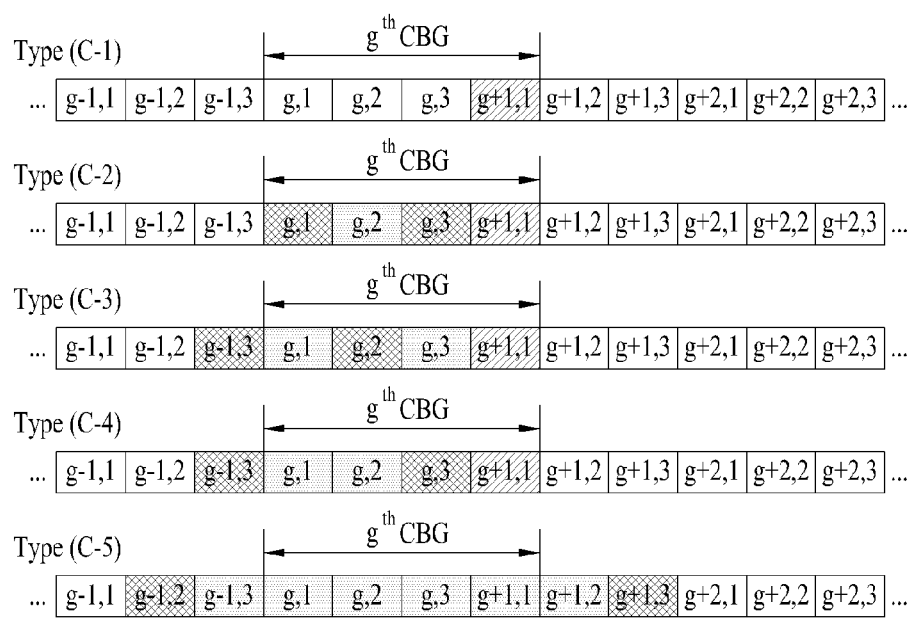

FIGS. 13 to 15 are diagrams illustrating CRC decoding result scenarios according to the present disclosure. Although the CB-CRC, CBG-CRC and TB-CRC are not illustrated in FIGS. 13 to 15 for clarity, the present disclosure can be applied when at least one of the CB-CRC, CBG-CRC and TB-CRC is included in some embodiments.

The CRC decoding state and CRC-bad cause for each CB illustrated in FIGS. 13 to 15 may be interpreted with reference to FIG. 12.

FIG. 13 illustrates a CRC decoding result scenario where the number of CBs included in the CBG is greater than that of FIG. 15. In contrast to FIG. 13, FIG. 14 illustrates a CRC decoding result scenario where a relatively small number of CBs are included in the last CBG of the TB. Unlike FIG. 13, FIG. 15 illustrates a CRC decoding result scenario where a small number of CBs are included in each CBG of the TB.

The CRC-bad occurrence scenario shown in FIG. 13 may be divided as follows.

(1) Type (A-2)~Type (A-3)

NACK occurs for some non-consecutive CBs (e.g., g2 and g5) in a g-th CBG.

When a UE or a gNB fails to receive an RS included in some non-consecutive CBs (e.g., g2 and g5) in the g-th CBG, additional CRC-bad occurs due to degradation of cross-slot channel estimation performance for CBs g1, g3 and g4, which are adjacent to CBs g2 and g5.

NACK occurs for some consecutive CBs (e.g., g2 to g5) in the g-th CBG.

When a UE or a gNB fails to receive an RS included in some consecutive CBs (e.g., g2 to g5) in the g-th CBG, additional CRC-bad occurs due to degradation of cross-slot channel estimation performance for CBs g1 and g6, which are adjacent to CBs g2 to g5.

(2) Type (A-4)~Type (A-5)

NACK occurs for some consecutive CBs (e.g., g1 to g4) in the g-th CBG.

When a UE or a gNB fails to receive an RS included in some consecutive CBs (e.g., g1 to g4) in the g-th CBG, additional CRC-bad occurs due to degradation of cross-slot channel estimation performance for the last CB, CB g8 of a (g-1)-th CBG and CB g5 of the g-th CBG, which are adjacent to CBs g1 to g4.

NACK occurs for some consecutive CBs over the (g-1)-th and g-th CBGs.

When a UE or a gNB fails to receive an RS included in some consecutive CBs across the (g-1)-th and g-th CBGs, additional CRC-bad occurs in some CBs adjacent thereto.

In summary, CRC-bad may occur in the following cases:

1) When NACK occurs for some non-consecutive CBs in a CBG;

2) When NACK occurs for some consecutive CBs in a CBG; and

3) When NACK occurs for consecutive CBs across consecutive CBGs.

Unlike FIG. 13, FIG. 14 illustrates that the number of CBs in the last CBG of the TB is different from that those of other CBGs.

Unlike FIGS. 12 and 13, FIG. 15 illustrates that CRC-bad occurs in CBs across three consecutive CBGs or more.

In summary, the CRC-bad occurrence based on the CBG level, which is illustrated in FIGS. 13 to 15, may be classified into the following three types in terms of the CB.

[1] NACK for some non-consecutive CBs in a CBG

[2] NACK for some consecutive CBs in a CBG

[3] NACK for consecutive CBs across consecutive CBGs

Figure 16:
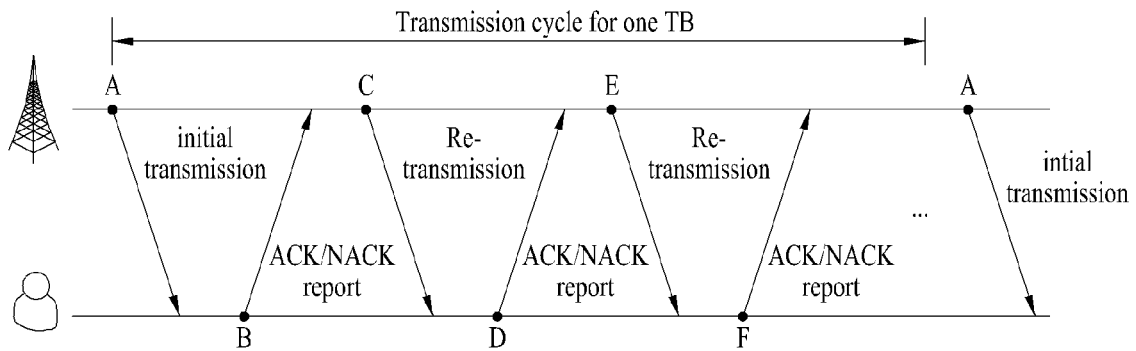
FIG. 16 is a diagram schematically illustrating a signal transmission and reception procedure between a BS and a UE.

FIG. 16 is a diagram schematically illustrating a signal transmission and reception procedure between a BS and a UE. In FIG. 16, it is assumed that one TB is transmitted by the BS and received by the UE.

The multi-level ACK/NACK reporting method proposed in the present disclosure may be different from the conventional one used in the legacy LTE system in terms of not only ACK/NACK reporting but also DCI configuration and retransmission. In particular, the configuration and interpretation of a multi-level ACK/NACK field for a CBG transmitted during initial TB transmission may be different from those of a multi-level ACK/NACK field for a retransmitted CB or CBG.

In FIG. 16, initial TB transmission is performed at time (A). In this case, it is assumed that a TB is composed of G CBGs and each CBG is composed of B CBs. In addition, it is assumed that the UE obtains the transport block size (TBS) of the corresponding TB and the values of G and B from DCI transmitted by the BS.

Hereinafter, a description will be given of how the BS and UE operate at times (B), (C), (D), (E), and (F) of FIG. 16 when the multi-level ACK/NACK method according to the present disclosure is applied.

3.1. CBG-Level ACK/NACK Reporting (at Time (B) of FIG. 16)

The UE completes decoding of G CBG and reports ACK/NACK for each CBG to the BS.

In this case, a NACK report may have the following various states by reflecting the CRC-bad type of a corresponding CBG. A k-bit ACK/NACK field may have $2^k$ states, and the $2^k$ states may include one state for indicating ACK and ($2^k-1$) states for indicating various NACK reasons.

In the present disclosure, it is assumed that the value of k is 2. However, when the value of k is greater than 2, various NACK states may be defined in a similar way as described below.

Hereinafter, a method of distinguishing between NACK states will be described in detail.

3.1.1. First Method (Method of Distinguishing Between NACK for Consecutive CBs in CBG)

NACK state 0: NACK occurs for X CBs or less.
NACK state 1: NACK occurs for (X+1) CBs or more, and the corresponding CBs are not consecutive.
NACK state 2: NACK occurs for (X+1) CBs or more, and the corresponding CBs are consecutive.

The value of X may be predefined in 3GPP specifications or configured cell-commonly or UE-specifically and (semi-) statically or dynamically. Alternatively, when the value of X is not separately configured, X may have a default value of 1.

The first method may be modified as follows.
NACK state 0: NACK does not continuously occur for X consecutive CBs
NACK state 1: NACK continuously occurs for X consecutive CBs
NACK state 2: Reserved 3.1.2. Second Method (Method of Identifying Whether NACK CBs in CBG are Consecutive and Distinguishing Between Positions of Consecutive CBs)

NACK state 0: NACK occurs for some of the CBs from a ceil(B/2)-th CB to a (B-1)-th CB or consecutive CBs thereamong.
NACK state 1: NACK occurs for some of the CBs from a 0-th CB to a (ceil(B/2)-1)-th CB or consecutive CBs thereamong.
NACK state 2: (i) NACK occurs for all CBs, or (ii) NACK occurs for some of the CBs from the 0-th CB to the (ceil(B/2)-1)-th CB or consecutive CBs thereamong and NACK occurs for some of the CBs from the ceil(B/2)-th CB to the (B-1)-th CB or consecutive CBs thereamong.

In other words, NACK state 2 means a state including both NACK state 0 and NACK state 1. Here, ceil(A) is a function of finding the smallest integer from among integers equal to or greater than A. For example, ceil (4.3)=5.

3.1.3. Third Method (Method of Distinguishing Between Ratios of NACK CBs in CBG)

NACK state 0: NACK occurs for X % CBs or less.
NACK state 1: NACK occurs for Y % CBs or less but more than X % CBs.
NACK state 2: NACK occurs for more than Y % CBs.

Here, the values of X and Y may be predefined in 3GPP specifications such that the values are determined based on at least one of the TBS or the value of G or B. Alternatively, the values of X and Y may be configured cell-commonly or UE-specifically and (semi-) statically or dynamically. Alternatively, when the values of X and Y are not separately configured, X and Y may have default values predefined in 3GPP specifications.

Additionally, when X is equal to Y, NACK state 1 may be reserved for other purposes.

The third method may be modified as follows.
NACK state 0: The number of NACK CBs are equal to or less than X % of the total CBs.
NACK state 1: The number of NACK CBs are more than X % of the total CBs.
NACK state 2: Reserved 3.1.4. Fourth Method (Method of Distinguishing Between CBG Retransmission Schemes)

NACK state 0: Request for incremental redundancy (IR) type retransmission
NACK state 1: Request for chase combining (CC) type retransmission
NACK state 2: Reserved In the fourth method, the IR and CC may mean the following operations.

IR: Scheduling request for a redundancy version (RV) having a non-zero value (for a parity bit) or a data (coded bit) portion corresponding to an RV different from the RV indicated by previous scheduling
CC: Scheduling request for an RV having a zero value (for a systematic bit) or a data (coded bit) portion corresponding to an RV equal to the RV indicated by previous scheduling The above-described first to fourth methods may be combined for implementation. More particularly, they may be combined in a random manner. For example, the following combination examples may be applied to distinguish between NACK states.

Combination Example #1

NACK state 0: NACK does not continuously occur for X consecutive CBs.
NACK state 1: NACK continuously occurs for X consecutive CBs, and IR-type retransmission is requested.
NACK state 2: NACK continuously occurs for X consecutive CBs, and CC-type retransmission is requested.

Combination Example #2

NACK state 0: NACK occurs for X % CBs or less.
NACK state 1: NACK occurs for more than X % CBs, and IR-type retransmission is requested
NACK state 2: NACK occurs for more than X % CBs, and CC-type retransmission is requested.

When NACK states are configured with multiple levels as described above, the UE may report a CRC-bad type for each CBG or a representative value of CRC-bad types for the entirety of one TB.

In the former case, a k-bit ACK/NACK state field is allocated to each CBG, and thus a total of (k*G) bits may be allocated for entire HARQ-ACK feedback.

In the latter case, HARQ-ACK feedback may be configured as follows. Assuming that the total number of CBGs is G, (i) a 1 bit for indicating only ACK or NACK may be allocated for each CBG, and (ii) k bits for indicating which state of the above-described NACK states (a total of $2^k$ states) is the representative state for all CBGs may be allocated. As a result, the HARQ-ACK feedback may be composed of a total of (G+k) bits.

In this case, reporting the NACK state for each CBG may be advantageous in that the NACK state for each CBG is accurately reported but has a disadvantage in that the payload size of ACK/NACK reporting increases.

On the other hand, reporting the representative NACK state for the entire TB may be disadvantageous in that it is difficult to accurately report the NACK state for each state but has an advantage in that the payload size of ACK/NACK reporting is reduced.

In this case, the following methods may be applied to select the representative NACK state for the entire TB.

For example, the UE may determine NACK states in each CBG where NACK occurs according to each of the methods, set the NACK state most frequently appearing in the TB as the representative NACK state for the entirety of the TB, and then report the corresponding NACK state.

As another example, if there is at least one CBG with a specific NACK state (e.g., state X), the UE may set NACK state X as the representative value for multiple CBGs. If there is no CBG corresponding to NACK state X, the UE may set another NACK state (e.g., state Y) as the representative value for the multiple CBGs. For instance, in the first and third method, NACK states 1 and 0 may be determined as states X and Y, respectively.

Whether the UE reports the NACK state for each CBG or the representative value for the TB in order to preforming HARQ ACK/NACK reporting may be predefined through association with the value of G (the number of CBGs) in 3GPP specifications. Alternatively, it may be configured by the BS cell-commonly or UE-specifically and (semi-) statically or dynamically.

As a particular example, when the BS drops transmission of some CBs (for example, some CBs may be dropped due to URLLC transmission), the BS may transmit to the UE information indicating that the corresponding CBs are dropped. If the UE obtains information indicating that the CBs are dropped before a specific time (Q) from the time when the UE reports UL ACK/ACK for received data in which the corresponding CBs are supposed to be included, the UE may perform HARQ ACK/NACK reporting according to the following options.

[Option 1] In the case of multi-level ACK/NACK, dropped CBs are excluded in distinguishing between NACK states.

(A) When X NACK CBs are counted according to the first method, the dropped CBs are not counted.

(B) In the second method, the dropped CBs are assumed to be ACK.

(C) When X % and Y % are calculated according to the third method, the dropped CBs are excluded from counting the total number of CBs and the number of NACK CBs.

(D) When the fourth method is applied, the retransmission type (e.g., IR or CC) is determined by considering only NACK CBs except the dropped CBs. This may be applied when the above-described methods are combined. For example, the UE may distinguish between NACK states without consideration of the dropped CBs.

[Option 2] In the case of single-level ACK/NACK, dropped CBs are excluded.

When reporting ACK/NACK for a CBG, the UE assumes the dropped CB as an ACK CB.

[Option 3] When remaining CBs except dropped CBs in a specific CBG are all ACK CBs, the UE reports the corresponding CBGs as ACK.

In this case, the specific time Q may be predefined depending on UE category in 3GPP specifications or configured by the BS cell-commonly or UE-specifically and (semi-) statically or dynamically.

3.2. CBG Retransmission (at Time (C) of FIG. 16)

Based on the CBG-level ACK/NACK and multi-level NACK state reported by the UE, the BS may perform retransmission as follows.

(1) Retransmission of all CBGs reported as NACK
(2) Retransmission of all CBs included in some of the CBGs reported as NACK
(3) Retransmission of some CBs included in some of the CBGs reported as NACK In this case, since configuration (2) includes configuration (1), examples of distinguishing between configurations (2) and (3) will be described. That is, it is assumed that the BS retransmits all CBs included in a NACK CBG or some CBs included in the NACK CBG.

Although the BS retransmits all CBs in the NACK CBG in general, the BS may retransmit some CBs of the NACK CBG in the following specific cases.

1) A case where the BS does not transmit some CBs in the corresponding CBG to transmit data with a relatively high priority such as URLLC, etc.

2) A case where the BS desires to transmit some CBs since the number of CBs included in the CBG, B is much greater than the number of resources available for retransmission 3) When the code rate of a CB transmitted at a specific time (e.g., slot) is higher than those of other CBs since an additional signal (e.g., synchronization signal or CSI-RS) is transmitted at the specific time during the initial TB transmission and when a CBG to which the corresponding CB belongs is reported as NACK, the BS may retransmit the CB with the higher code rate preferentially.

4) A case in which the BS is capable of estimating that CRC-bad occurs only in few CBs in the corresponding CBG based on the reported multi-level NACK state 5) A case in which the BS is capable of estimating that NACK occurs for consecutive CBGs and CRC-bad occurs only in few CBs in the first and last CBGs among the consecutive NACK CBGs based on the reported multi-level NACK state In this case, the BS may inform the UE through DCI whether the BS schedules the retransmission of all CBs included in the NACK CBG (on a CBG basis) or the retransmission of some CBs included in the NACK CBG (on a CBG basis). Alternatively, it may be automatically determined by UE's HARQ-ACK feedback.

In the latter case, if the number of NACK CBGs is less than or equal to a specific value, the BS may schedule the retransmission on a CB basis. On the contrary, if the number of NACK CBGs is more than the specific value, the BS may schedule the retransmission on a CBG basis.

In addition, the configuration of DCI, which is transmitted by the BS, may vary depending on whether the BS retransmits all or some CBs included in the NACK CBG.

Moreover, the ACK/NACK reporting method and payload configuration for the retransmission may vary depending on whether the BS retransmits the entirety of a CBG or some CBs. In particular, differences between the ACK/NACK reporting method and payload configuration for the retransmission and those for the initial transmission may be explicitly indicated by DCI at the CBG retransmission time. Alternatively, the ACK/NACK reporting method for the retransmission and the ACK/NACK reporting method for the initial transmission may be separately predefined in 3GPP specifications. Further, they may be configured by the BS cell-commonly or UE-specifically and (semi-) statically or dynamically. Additionally, the ACK/NACK reporting method and payload configuration for the CBG retransmission may be configured differently depending on retransmission times (e.g., (D) and (F) of FIG. 16).

3.3. ACK/NACK Reporting on CBG Retransmission (at Time (D) of FIG. 16)

The UE reports the CBG-level ACK/NACK and multi-level NACK state at time (B) of FIG. 16, receives retransmission in response to the transmitted report at time (C), and then reports ACK/NACK for a retransmitted CBG or some retransmitted CBs at time (D) again.

If the retransmission at time (C) corresponds to retransmission of all CBs included in a specific CBG, the UE may perform ACK/NACK reporting using the same method as that used for reporting the CBG-level ACK/NACK and multi-level NACK state at time (B). However, in this case, the following options may be further applied. That is, the options may include configuring a payload such that ACK/NACK is reported for only the retransmitted CBG or all CBs in the initial TB.

On the other hand, if the retransmission at time (C) corresponds to retransmission of some CBs included in a CBG, a CB where CRC-bad occurs (hereinafter, such a CB is referred to as a CRC-bad CB) in a NACK CBG reported at time (B) may not be included in the CBs retransmitted at time (C). Thus, the BS and UE may differently interpret NACK during the ACK/NACK reporting procedure, which is performed at time (D).

First, the following classification may be established depending on how the CRC-bad CBs reported at time (B) are included in the CBs retransmitted at time (C).

(1) All of the CRC-bad CBs at time (B) are included in the CBs retransmitted at time (C).

(2) None of the CRC-bad CBs at time (B) are included in the CBs retransmitted at time (C).

(3) Some the CRC-bad CBs at time (B) are included in the CBs retransmitted at time (C).

However, the BS may not determine, based on the CBG-level ACK/NACK report at time (D), which one of the following three scenarios is the cause that the CBs retransmitted at time (C) are reported as CBG NACK at time (D).

Whether the retransmitted CBs are still NACK CBs after combining although the retransmitted CBs include the CRC-bad CBs at time (B)

Whether the retransmitted CBs are different from the CRC-bad CBs at time (B)

Whether the corresponding CBG is a NACK CBG since the retransmitted CBs include only some of the CRC-bad CBs at time (B)

As a result, the BS may not determine how to select CBs to be retransmitted at time (E).

To solve this problem, the present disclosure proposes the following method.

First, the UE maintains the ACK/NACK reporting method at time (D) to be equal to the CBG-level ACK/NACK reporting method at time (B), the UE may use a multi-level NACK state field for a CBG that is not retransmitted at time (C) as a field for indicating the decoding result of each CB included in the CBG retransmitted at time (C) during the ACK/NACK reporting at time (D).

Here, since the multi-level NACK state may mean a field for providing additional information on a CBG where NACK occurs as described in section 3.1, information on the multi-level NACK state for the CBG, which is not retransmitted at time (C), is not required. As a result, the corresponding field may be used to represent in further detail the CRC-bad type of the CBG to which the CBs retransmitted at time (C) belong. The expression of "further detail" may be defined as follows.

1) A relationship between the CBs retransmitted at time (C) and the CRC-bad CBs at time (B): In this case, information on the relationship may contain one of the following items.

Whether all of the CRC-bad CBs at time (B) are included in the CBs retransmitted at time (C)

Whether none of the CRC-bad CBs at time (B) are included in the CBs retransmitted at time (C)

Whether some the CRC-bad CBs at time (B) are included in the CBs retransmitted at time (C)

2) A method of informing whether each of the CBs retransmitted at time (C) is a CRC-good CB or a CRC-bad CB using single-level ACK/NACK In this case, the UE may independently report the CRC decoding result of each of the retransmitted CBs or the CRC decoding results of all CBs (including the retransmitted CBs and CBs that are not retransmitted) in the CBG to which the retransmitted CBs belong.

3.4. CBG Retransmission (at Time (E) of FIG. 16)

At time (E), the BS may retransmit all CBs in a specific CBG, some CBs in the specific CBG, or CBs including or except the CBs retransmitted at time (C) based on the ACK/NACK reported at time (D) in a similar way as described in section 3.2. In addition, the BS may retransmit, at time (E), the CBs or CBG that is not retransmitted at time (C) regardless of the ACK/NACK report at time (D). Then, the UE may use the same method as described in section 3.3 to perform ACK/NACK reporting at time (E).

The above-described ACK/NACK method may be applied not only to ACK/NACK reporting for DL transmission but also to ACK/NACK reporting for UL transmission. Accordingly, when a UE performs initial TB transmission and TB retransmission, a BS may perform ACK/NACK reporting according to the above-described methods.

In addition, the methods described with reference to (B) to (E) of FIG. 16 may be applied either independently or in combination.

Moreover, the CBG-level ACK/NACK, multi-level ACK/NACK, and single-level ACK/NACK may be independent from each other. That is, each of them may be independently used at each time.

Further, the multi-level ACK/NACK technique proposed in the present disclosure is not limited to ACK/NACK reporting on a CBG basis. That is, the multi-level ACK/NACK technique can be applied when ACK/NACK is reported on a TB basis. Specifically, a UE or a BS may perform multi-level ACK/NACK reporting by distinguishing between NACK states for a plurality of TBs with multiple levels.

Figure 17:
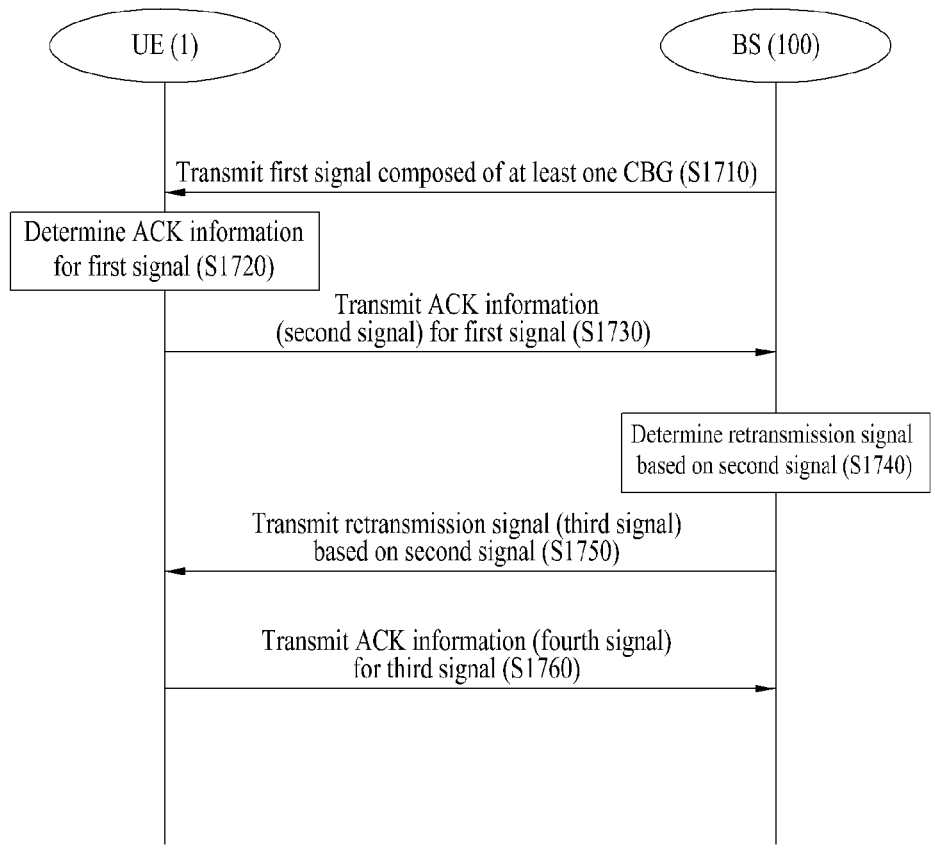
FIG. 17 is a diagram illustrating a signal transmission and reception method between a UE and a BS applicable to the present disclosure.

FIG. 17 is a diagram illustrating a signal transmission and reception method between a UE and a BS according to the present disclosure. More specifically, FIG. 17 shows that the BS (base station, e.g., eNB or gNB) transmits a signal and the UE receives an ACK signal for the received signal (that is, the BS and the UE correspond to a transmitting node and a receiving node, respectively). However, in some embodiments, the BS and UE operations illustrated in FIG. 17 may be reversed. In other words, a UE may operate as a receiving node and a BS may operate as a transmitting node. In the following, it is assumed that a BS operates as a transmitting node and a UE operates as a receiving node.

First, a BS 100 transmits to a UE 1 a signal (e.g., first signal) composed of at least one CBG (S1710). In this case, each CBG may comprise at least one CB.

Next, the UE 1 determines ACK information for the signal (e.g., first signal) received in step S1710 (S1720). According to an embodiment of the present disclosure, when the UE 1 determines that NACK occurs for a specific CBG, the UE may determine a particular NACK state for the specific CBG.

For example, the UE 1 may determine whether the number of CBs where NACK occurs in the corresponding CBG is greater than or equal to a predetermined value. When the number of CBs where NACK occurs is greater than or equal to the predetermined value, the UE may determine the particular NACK state for the specific CBG based on whether there are consecutive CBs among the CBs where NACK occurs.

As another example, the UE 1 may determine the particular NACK state for the specific CBG based on a location region in which the CBs where NACK occurs in the corresponding CBG are present.

As still another example, the UE 1 may determine the particular NACK state for the specific CBG based on a ratio of the CBs where NACK occurs to whole CBs included in the corresponding CBG.

As a further example, the UE 1 may determine the particular NACK state for the specific CBG based on a retransmission method preferred by the UE for the corresponding CBG.

Thereafter, the UE 1 transmits, to the BS 100, the ACK information determined in step S1720 using a plurality of numbers of bit information (S1730).

In this case, the plurality of numbers of the bit information may indicate any one of the following states: one state for indicating ACK; and N states for indicating NACK, where N may be a natural number larger than 1.

Each of the N states may indicate any combination of at least one of: (A) first information indicating whether the number of CBs where NACK occurs in the corresponding CBG is greater than or equal to the predetermined value and whether, when the number of CBs where NACK occurs is greater than or equal to the predetermined value, the consecutive CBs are present among the CBs where NACK occurs; (B) second information indicating the location region in which the CBs where NACK occurs in the corresponding CBG are present; (C) third information indicating a range including the ratio of the CBs where NACK occurs to the whole CBs included in the corresponding CBG; and (D) fourth information indicating the retransmission method preferred by the UE for the corresponding CBG.

More specifically, the first to fourth information may indicate the following particular information.

The first information may indicate one of: (A-1) information indicating that the number of CBs where NACK occurs in the corresponding CBG is smaller than or equal to the predetermined value; (A-2) information indicating that the number of CBs where NACK occurs in the corresponding CBG is greater than the predetermined value and the CBs where NACK occurs are not consecutive; and (A-3) information indicating that the number of CBs where NACK occurs in the corresponding CBG is greater than the predetermined value and the consecutive CBs are present among the CBs where NACK occurs.

The second information may indicate one of: (B-1) information indicating that among first and second CBGs obtained by dividing the corresponding CBG in half, the first CBG includes at least one CB where NACK occurs; (B-2) information indicating that among the first and second CBGs obtained by dividing the corresponding CBG in half, the second CBG includes at least one CB where NACK occurs; and (B-3) information indicating that both the first and second CBGs obtained by dividing the corresponding CBG in half include at least one CB where NACK occurs.

The third information may indicate one of: (C-1) information indicating that the ratio of the CBs where NACK occurs to the whole CBs included in the corresponding CBG is smaller than or equal to a first threshold; (C-2) information indicating that the ratio of the CBs where NACK occurs to the whole CBs included in the corresponding CBG is greater than the first threshold and smaller than or equal to a second threshold; and (C-3) information indicating that the ratio of the CBs where NACK occurs to the whole CBs included in the corresponding CBG is greater than the second threshold.

The fourth information may indicate one of: (D-1) information indicating that the retransmission method preferred by the UE for the corresponding CBG is an incremental redundancy (IR) type; and (D-2) information indicating that the retransmission method preferred by the UE for the corresponding CBG is a chase combining (CC) type.

Additionally, although not shown in FIG. 17, when several CBs in the received signal composed of the at least one CBG are dropped by the BS 100, the UE 1 may receive information on the dropped CBs from the BS 100.

In this case, the UE 1 may determine the N states by excluding the dropped CBs from counting or assuming the dropped CBs as ACK in step S1720.

The BS 100 may determine a retransmission signal based on a second signal received from the UE 1 (S1740) and then transmit the retransmission signal (third signal) to the UE 1 (S1750).

The third signal may comprise retransmission of whole CBs included in a CBG reported by the UE 1 as NACK in step S1730 or retransmission of several CBs included in the CBG reported by the UE 1 as NACK in step S1730.

More specifically, when the BS 100 drops several CBs in the first signal to transmit service data with a relatively high priority such as URLLC, the BS 100 may retransmit, to the UE 1, the several CBs included in the CBG reported by the UE 1 as NACK.

In addition, when the BS 100 intentionally drops the several CBs and provides information on the dropped CBs to the UE 1 directly or indirectly, the UE 1 may report a CBG including the corresponding CBs as ACK. In this case, the BS 100 may also transmit the dropped CB s in the CBGs in a selective manner.

The reason for why the UE 1 does not assume the dropped CBs as NACK even if the UE 1 obtains the information on the CBs dropped by the BS 100 may be that (1) the UE 1 correctly receives the information indicating that the several CBs are dropped (if the UE fails to detect the information, the corresponding CBs should be reported as NACK) and (2) the UE 1 interprets all CBs in the CBG except the dropped CBs as ACK.

The UE 1 may transmit ACK information (fourth signal) for at least one CBGs included in the third signal to the BS 100 (S1760). In this case, the ACK information for the third signal may be configured and transmitted in a similar way as that for the first signal.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, it may be regulated that information on whether the proposed methods are applied (or information on rules related to the proposed methods) should be transmitted from a BS to a UE through a predefined signal (e.g., a physical layer signal, a higher layer signal, etc.).

4. Device Configuration

Figure 18:
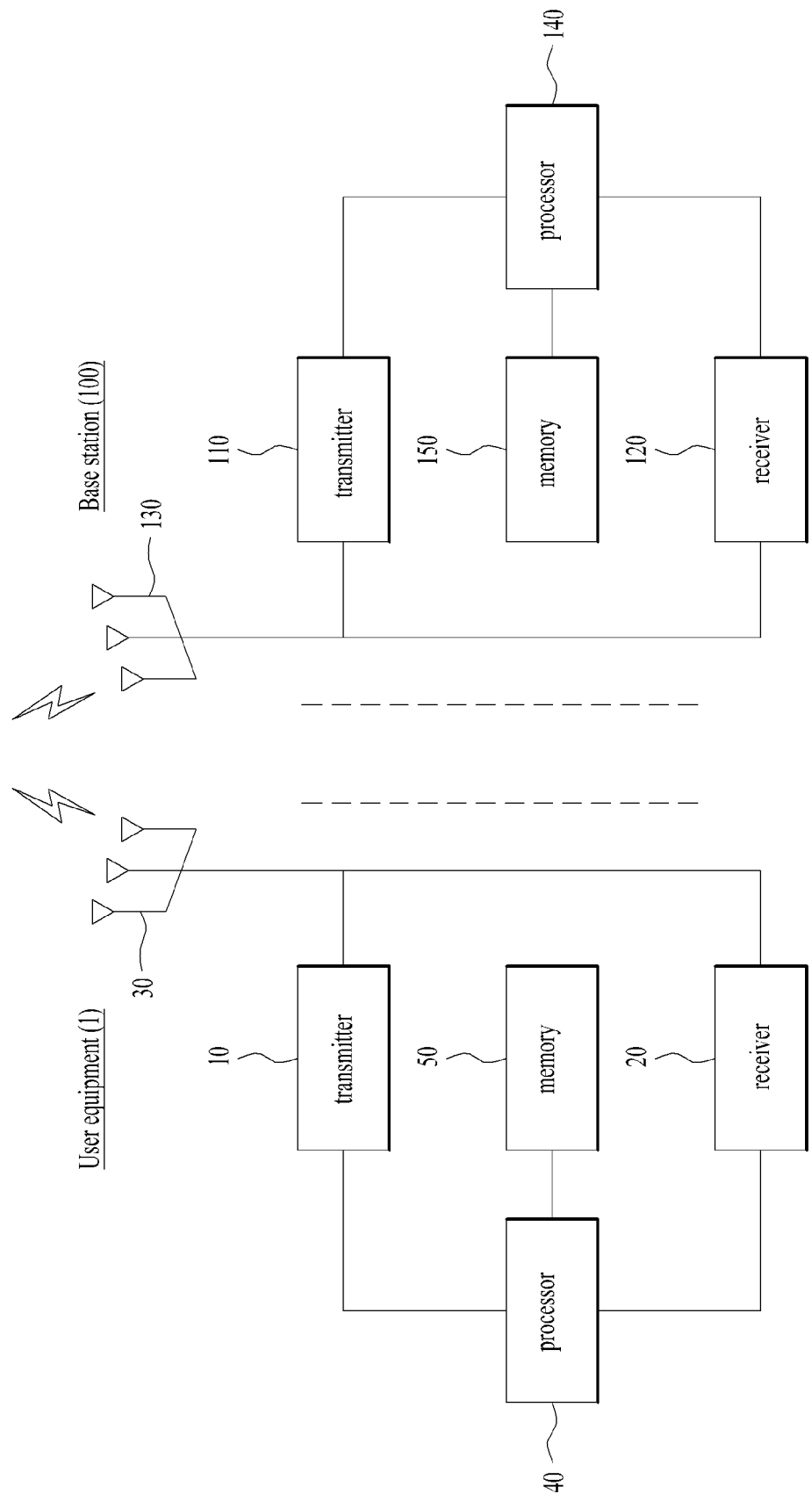
FIG. 18 is a diagram illustrating the configurations of a UE and a BS for implementing the proposed embodiments.

FIG. 18 is a diagram illustrating the configurations of a UE and a BS for implementing the proposed embodiments. The UE and the BS illustrated in FIG. 18 are implemented to perform the embodiments of the signal transmission and reception method between a BS and a UE.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above configuration, the UE 1 receives a signal composed of at least one CBGs from the BS 100 through the receiver 20 and transmits ACK information including a plurality of numbers of bit information for each CBG to the BS 100 through the transmitter 10.

The BS 100 transmits a signal composed of at least one CBGs to the UE 1 through the transmitter 110 and receives ACK information including a plurality of numbers of bit information for each CBG through the receiver 120.

Each CBG may be composed of at least one CB. The plurality of numbers of the bit information may indicate any one of the following states: one state for indicating ACK; and N states for indicating NACK, where N may be a natural number larger than 1.

Each of the N states may indicate any combination of at least one of: (A) first information indicating whether the number of CBs where NACK occurs in a corresponding CBG is greater than or equal to a predetermined value and whether, when the number of CBs where NACK occurs is greater than or equal to the predetermined value, there are consecutive CBs among the CBs where NACK occurs; (B) second information indicating a location region in which the CBs where NACK occurs in the corresponding CBG are present; (C) third information indicating a range including the ratio of the CBs where NACK occurs to whole CBs included in the corresponding CBG; and (D) fourth information indicating a retransmission method preferred by the UE for the corresponding CBG.

The transmitter and receiver of each of the UE and BS may perform packet modulation/demodulation for data transmission, high-speed packet channel coding, OFDMA packet scheduling, TDD packet scheduling, and/or channel multiplexing. Each of the UE and BS of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MB S) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting and receiving a signal to and from a base station (BS) by a user equipment (UE) in a wireless communication system, the method comprising:
receiving, from the BS, a signal composed of at least one code block group (CBG);
based on one or more code blocks (CBs) in the received signal, composed of the at least one CBG, being dropped by the BS, receiving information on the dropped one or more CBs from the BS at a specific time before a transmission of acknowledgement (ACK) information for each of the at least one CBG; and
transmitting, to the BS, the ACK information, wherein the ACK information includes a plurality of bits,
wherein each of the at least one CBG comprises at least one code block (CB),
wherein the plurality of bits indicate one state for ACK and N states for indicating non-acknowledgement (NACK), where N is a natural number larger than 1, and
wherein each of the N states indicates at least one of:
first information indicating whether a number of CBs for which a NACK occurs in a corresponding CBG is greater than or equal to a predetermined value, and when the number of CBs for which a NACK occurs is greater than or equal to the predetermined value, whether there are consecutive CBs among the CBs for which a NACK occurs;
second information indicating a location region including the number of CBs for which a NACK occurs in the corresponding CBG;
third information indicating a ratio of the number of CBs for which a NACK occurs to all CBs included in the corresponding CBG; and
fourth information indicating a retransmission method preferred by the UE for the corresponding CBG,
wherein, based on remaining CBs, excluding the one or more dropped CBs in the corresponding CBG, being all ACK CBs, the one or more dropped CBs are assumed to be ACK CBs, and
wherein, based on remaining CBs, excluding the one or more dropped CBs in the corresponding CBG, not being all ACK CBs, the one or more dropped CBs are not assumed to be ACK CBs.

2. The method of claim 1, wherein the first information indicates one of:
information indicating that the number of CBs for which a NACK occurs in the corresponding CBG is smaller than or equal to the predetermined value;
information indicating that the number of CBs for which a NACK occurs in the corresponding CBG is greater than the predetermined value and the CBs for which a NACK occurs are not consecutive; and
information indicating that the number of CBs for which a NACK occurs in the corresponding CBG is greater than the predetermined value and the consecutive CBs are present among the CBs for which a NACK occurs.

3. The method of claim 1, wherein the second information indicates one of:
information indicating that among first and second CBGs obtained by dividing the corresponding CBG in half, the first CBG includes at least one CB where a NACK occurs;
information indicating that among the first and second CBGs obtained by dividing the corresponding CBG in half, the second CBG includes at least one CB where a NACK occurs; and
information indicating that both the first and second CBGs obtained by dividing the corresponding CBG in half include at least one CB where a NACK occurs.

4. The method of claim 1, wherein the third information indicates one of:
information indicating that the ratio of the CBs for which a NACK occurs to the all CBs included in the corresponding CBG is smaller than or equal to a first threshold;
information indicating that the ratio of the CBs for which a NACK occurs to the all CBs included in the corresponding CBG is greater than the first threshold and smaller than or equal to a second threshold; and
information indicating that the ratio of the CBs for which a NACK occurs to the all CBs included in the corresponding CBG is greater than the second threshold.

5. The method of claim 1, wherein the fourth information indicates one of:
information indicating that the retransmission method preferred by the UE for the corresponding CBG is an incremental redundancy (IR) type; and
information indicating that the retransmission method preferred by the UE for the corresponding CBG is a chase combining (CC) type.

6. The method of claim 1, further comprising: receiving, from the BS, a response message in response to the ACK information for each CBG.

7. The method of claim 6, wherein the response message comprises:
retransmission of all CBs included in a CBG reported by the UE as NACK; or
retransmission of less than all CBs included in the CBG reported by the UE as NACK.

8. The method of claim 6, wherein when less than all CBs in the received signal, composed of the at least one CBG, are dropped by the BS, the response message comprises retransmission of the less than all CBs included in a CBG reported by the UE as NACK.

9. The method of claim 6, further comprising: transmitting, to the BS, ACK information for at least one CBG included in the response message.

10. A method of transmitting and receiving a signal to and from a user equipment (UE) by a base station (BS) in a wireless communication system, the method comprising:
transmitting, to the UE, a signal composed of at least one code block group (CBG);
based on one or more code blocks (CBs) in the transmitted signal, composed of the at least one CBG, being dropped by the BS, transmitting information on the dropped one or more CBs to the UE at a specific time before a transmission of acknowledgement (ACK) information for each of the at least one CBG; and
receiving, from the UE, the ACK information, wherein the ACK information includes a plurality of bits,
wherein each of the at least one CBG comprises at least one code block (CB), wherein the plurality of bits indicate one state for ACK and N states for indicating non-acknowledgement (NACK), where N is a natural number larger than 1, and wherein each of the N states indicates at least one of:

first information indicating whether a number of CBs for which a NACK occurs in a corresponding CBG is greater than or equal to a predetermined value, and when the number of CBs for which a NACK occurs is greater than or equal to the predetermined value, whether there are consecutive CBs among the CBs for which a NACK occurs in the corresponding CBG;

second information indicating a location region including the number of CBs for which a NACK occurs in the corresponding CBG;

third information indicating a ratio of the number of CBs for which a NACK occurs to all CBs included in the corresponding CBG; and fourth information indicating a retransmission method preferred by the UE for the corresponding CBG, wherein, based on remaining CBs, excluding the one or more dropped CBs in the corresponding CBG, being all ACK CBs, the one or more dropped CBs are assumed to be ACK CBs, and wherein, based on remaining CBs, excluding the one or more dropped CBs in the corresponding CBG, not being all ACK CBs, the one or more dropped CBs are not assumed to be ACK CBs.

11. A user equipment (UE) for transmitting and receiving a signal to and from a base station (BS) in a wireless communication system, the UE comprising:
a transmitter;
a receiver; and
a processor operatively connected to the transmitter and the receiver,
wherein the processor is configured to:
receive, from the BS, a signal composed of at least one code block group (CBG);
based on one or more code blocks (CBs) in the received signal, composed of the at least one CBG, being dropped by the BS, receive information on the dropped one or more CBs from the BS at a specific time before a transmission of acknowledgement (ACK) information for each of the at least one CBG; and
transmit, to the BS, the ACK information, wherein the ACK information includes a plurality of bits,
wherein each of the at least one CBG comprises at least one code block (CB),
wherein the plurality of bits indicate one state for ACK and N states for indicating non-acknowledgement (NACK), where N is a natural number larger than 1, and
wherein each of the N states indicates at least one of:
first information indicating whether a number of CBs for which a NACK occurs in a corresponding CBG is greater than or equal to a predetermined value, and when the number of CBs for which a NACK occurs is greater than or equal to the predetermined value, whether there are consecutive CBs among the CBs for which a NACK occurs;
second information indicating a location region including the number of CBs for which a NACK occurs in the corresponding CBG;
third information indicating a ratio of the number of CBs for which a NACK occurs to all CBs included in the corresponding CBG; and
fourth information indicating a retransmission method preferred by the UE for the corresponding CBG,
wherein, based on remaining CBs, excluding the one or more dropped CBs in the corresponding CBG, being all ACK CBs, the one or more dropped CBs are assumed to be ACK CBs, and
wherein, based on remaining CBs, excluding the one or more dropped CBs in the corresponding CBG, not being all ACK CBs, the one or more dropped CBs are not assumed to be ACK CBs.

12. A base station (BS) for transmitting and receiving a signal to and from a user equipment (UE) in a wireless communication system, the BS comprising:
a transmitter;
a receiver; and
a processor operatively connected to the transmitter and the receiver,
wherein the processor is configured to:
transmit, to the UE, a signal composed of at least one code block group (CBG);
based on one or more code blocks (CBs) in the transmitted signal composed of the at least one CBG being dropped by the BS, transmit information on the dropped one or more CBs to the UE at a specific time before a transmission of acknowledgement (ACK) information for each of the at least one CBG; and
receive, from the UE, the ACK information, wherein the ACK information includes a plurality of bits,
wherein each of the at least one CBG comprises at least one code block (CB),
wherein the plurality of bits indicate one of state for ACK and N states for indicating non-acknowledgement (NACK), where N is a natural number larger than 1, and
wherein each of the N states indicates at least one of:
first information indicating whether a number of CBs for which a NACK occurs in a corresponding CBG is greater than or equal to a predetermined value, and when the number of CBs for which a NACK occurs is greater than or equal to the predetermined value, whether there are consecutive CBs among the CBs for which a NACK occurs;
second information indicating a location region including the number of CBs for which a NACK occurs in the corresponding CBG;
third information indicating a ratio of the number of CBs for which a NACK occurs to all CBs included in the corresponding CBG; and
fourth information indicating a retransmission method preferred by the UE for the corresponding CBG,
wherein, based on remaining CBs, excluding the one or more dropped CBs in the corresponding CBG, being all ACK CBs, the one or more dropped CBs are assumed to be ACK CBs, and
wherein, based on remaining CBs, excluding the one or more dropped CBs in the corresponding CBG, not being all ACK CBs, the one or more dropped CBs are not assumed to be ACK CBs.

13. The UE of claim 11, wherein the UE communicates with at least one of a mobile terminal, a network and an autonomous vehicle.

* * * * *